United States Patent [19]

Williams

[11] Patent Number: 4,526,954

[45] Date of Patent: Jul. 2, 1985

[54] ORGANOSILOXANE POLYMERS AND COMPOSITIONS CONTAINING SAME CURABLE UPON EXPOSURE TO GASEOUS OXYGEN

[75] Inventor: Thomas C. Williams, Ridgefield, Conn.

[73] Assignee: Union Carbide Corporation, Danbury, Conn.

[21] Appl. No.: 566,297

[22] Filed: Dec. 28, 1983

[51] Int. Cl.$^3$ .............................................. C08G 77/06
[52] U.S. Cl. ........................................ 528/15; 528/14; 528/17; 528/18; 528/19; 528/26; 528/31; 528/37; 528/32; 556/419; 556/462; 524/860
[58] Field of Search ....................... 528/32, 37, 26, 31, 528/14, 15, 17, 18, 19; 556/419, 462; 524/860

[56] References Cited

U.S. PATENT DOCUMENTS

| | | | |
|---|---|---|---|
| 2,951,057 | 8/1960 | Wiese et al. | 528/32 |
| 2,957,901 | 10/1960 | Olson et al. | 528/32 |
| 3,408,321 | 10/1968 | Ashby | 260/37 |
| 3,632,826 | 1/1972 | Berger | 260/448.2 N |
| 3,655,598 | 4/1972 | Antonen et al. | 528/32 |
| 3,941,741 | 3/1976 | De Zuba et al. | 260/37 SB |
| 4,039,504 | 8/1977 | Homan et al. | 260/37 SB |
| 4,039,505 | 8/1977 | Homan et al. | 260/37 SB |
| 4,060,539 | 11/1977 | Seiler et al. | 260/448.8 R |
| 4,066,603 | 1/1978 | Homan et al. | 260/37 SB |
| 4,070,328 | 1/1978 | Homan et al. | 260/37 SB |
| 4,070,329 | 1/1978 | Homan et al. | 260/37 SB |
| 4,139,519 | 2/1979 | Itoh et al. | 260/42.26 |
| 4,151,156 | 4/1979 | Itoh et al. | 260/37 SB |
| 4,201,698 | 5/1980 | Itoh et al. | 260/3 |
| 4,239,668 | 12/1980 | Clark et al. | 260/29.2 M |
| 4,239,674 | 12/1980 | Homan et al. | 260/37 SB |
| 4,248,993 | 2/1981 | Takago | 528/32 |
| 4,252,932 | 2/1981 | Homan et al. | 528/15 |
| 4,265,792 | 5/1981 | Homan et al. | 260/18 S |
| 4,267,296 | 5/1981 | Homan | 528/15 |
| 4,268,655 | 5/1981 | Homan et al. | 528/15 |
| 4,269,741 | 5/1981 | Homan | 260/18 S |
| 4,269,963 | 5/1981 | Homan et al. | 528/17 |
| 4,269,991 | 5/1981 | Homan et al. | 556/427 |
| 4,272,415 | 6/1981 | Homan et al. | 260/18 S |
| 4,272,623 | 6/1981 | Homan et al. | 528/15 |
| 4,275,184 | 6/1981 | Bargain et al. | 528/26 |
| 4,279,792 | 7/1981 | Homan et al. | 260/18 S |
| 4,281,094 | 7/1981 | Homan et al. | 528/30 |
| 4,284,539 | 8/1981 | Homan et al. | 260/18 S |
| 4,292,422 | 9/1981 | Homan et al. | 528/15 |
| 4,293,676 | 10/1981 | Homan et al. | 528/15 |
| 4,301,269 | 11/1981 | Hashimoto et al. | 528/34 |
| 4,302,571 | 11/1981 | Arai et al. | 528/32 |

FOREIGN PATENT DOCUMENTS 1153721  6/1966  United Kingdom .

Primary Examiner—Melvyn I. Marquis
Attorney, Agent, or Firm—Paul W. Leuzzi, II

[57] ABSTRACT

Polyorganosiloxanes that are curable to crosslinked solid material, at ambient temperature upon exposure to gaseous oxygen, wherein the polyorganosiloxane contains, per molecule, at least one monovalent olefinically polyunsaturated organic radical containing at least one 1,3-pentadienylene group or 1,4-pentadienylene group bonded to silicon through silicon-to-carbon bond and wherein any remaining valence of silicon is satisfied by a silicon-to-oxygen-to-silicon bond or by a monovalent organic radical free of more than one olefinically unsaturated group per monovalent organic radical, which monovalent organic radical is bonded to silicon by a silicon-to-carbon bond. Compositions are also described containing the novel polyorganosiloxanes, suitable driers either chemically combined in the polyorganosiloxane or physically mixed therewith. The compositions can also contain fillers, plasticizers and/or catalyst activators.

30 Claims, No Drawings

ORGANOSILOXANE POLYMERS AND COMPOSITIONS CONTAINING SAME CURABLE UPON EXPOSURE TO GASEOUS OXYGEN

BACKGROUND OF THE INVENTION

1. Field of the Invention

This invention relates to novel polyorganosiloxanes curable to crosslinked solid materials at ambient temperature upon exposure to oxygen and to novel curable compositions containing same. More specifically, this invention relates to novel RTV polyorganosiloxanes containing one or more 1,3-pentadienylene or 1,4-pentadienylene groups per molecule and gaseous oxygen curing compositions containing same. The novel polyorganosiloxanes and compositions are useful as casting, embedment and encapsulation media and as sealants, caulkings, coatings, including conformal coatings and adhesives.

2. Description of the Prior Art

Several types of RTV (room temperature vulcanizable) silicones are described in the prior art as discussed below:

Siloxanol-silicate type.

In this earliest RTV silicon system the major polymer component is a linear or lightly branched silicone with silanol terminal groups. Alkyl silicates or alkylpolysilicates, typically tetraethyl orthosilicate or partially hydrolyzed and condensed products therefrom, are used as crosslinking agents. Catalysts are usually tin compounds, e.g. stannous octoate, dibutyltindilaurate. Fillers, color pigments and other ancillaries are also used. The system is usually prepared in two parts which keep the siloxanol polymer and catalyst separated. At point of use, the two parts are mixed and crosslinking begins; thereafter the fluid or plastic working life is limited. Accurately measured proportions and thorough mixing are necessary to produce uniformly cured articles. The need for mixing limits useful compositions to those which are easily stirred and poured and this in turn limits polymer viscosity and level of filler loading. In the early development of this system the role of water was not appreciated. Later, it was established that at least catalytic amounts of water is essential and that unless special steps were taken for its rigorous exclusion prior to use, there was sufficient water absorbed on filler or otherwise fortuitously present to prematurely catalyze the crosslinking reactions.

Moisture reactive types.

The next major development in RTV silicones is the one-part system in which a mixture of all components (except water) remains workable in a sealed container until exposed to moisture, usually that present in the normal atmosphere. The major polymer component is a linear or lightly branched silicone having reactive groups (X) that readily undergo hydrolytic polymerization to form siloxane as shown by the following reactions:

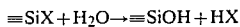 (Rxn 1)

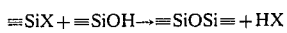 (Rxn 2)

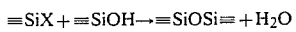 (Rxn 3)

The reaction groups, ≡SiX, may be present in terminal or non-terminal positions or both. A large number of reactive groups are reported in the prior art to be effective. Most commonly used are those containing Si—O—C or Si—N< structures, particularly —OMe, —OEt,

—NMe₂, —ONEt₂. The crosslinker component is usually a silane or low molecular weight polysiloxane bearing three or more reactive groups per molecule. A wide variety of catalysts are used, choice depending on the nature of X; metal and amine carboxylate salts are often useful.

Advantages of one-part RTV systems over the earlier two-part systems are that the inconveniences and error incurred in metering and mixing at point of use are eliminated and, since stirring at point of use is not necessary, paste forms can be used and this allows use of higher viscosity polymers and a wider range of fillers and filler levels to achieve improvements in performance properties.

Utility of the moisture reactive type of RTV silicone is limited by the nature of the by-products HX (see Rxn 1, 2) which can be objectionably acidic, alkaline, toxic, corrosive, malodorous or in some other way obnoxious. This limitation has stimulated the search for RTV silicone systems which form only innocuous by-products or even none at all.

Vinyl-hydrosiloxane type.

In this more recent prior art development, crosslinking is accomplished by hydrosilylation as in the following reaction:

 (Rxn 4)

The major polymer component is usually a linear or lightly branched silicone with vinyl or other olefinic groups in terminal or non-terminal positions. The crosslinker is usually a low molecular weight siloxane with three or more hydrosiloxane units per molecule. Catalysts are typically platinum compounds which are effective at ppm levels. Compositions of this type which are active at room temperature are two-part systems. One-part systems are made with inhibited catalysts but require elevated temperatures for at least brief periods to activate the catalyst and are therefore not true RTV systems.

A weak point of this kind of crosslinking system is that the platinum catalyst can be poisoned by many substances. A significant advantage is that no obnoxious by-products are formed.

Oxygen curable mercaptoalkyl type.

In this more recently developed type of prior art RTV silicone, crosslinking occurs by oxidation of mercaptoalkyl substituents upon contact with molecular oxygen, as in

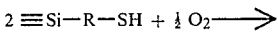

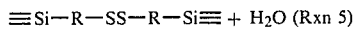 (Rxn 5)

The major polymer component is a linear or lightly branched silicone having mercaptoalkyl substituents, such as 3-mercaptopropyl, on silicon. Crosslinker components (optional) are usually low molecular weight silicones having three or more mercaptoalkyl substituents per molecule. Catalysts are organic compounds of prooxidant metals such as cobalt.

With respect to limitations imposed by by-products, in this system the major by-product is water (Rxn 5) which is considered relatively innocuous and which can be tolerated or, if necessary, removed in many applications. However, under some conditions, side reactions may form small amounts of malodorous and toxic hydrogen sulfide. Furthermore, in contact with sensitive surfaces, such as silver or copper, unreacted mercaptoalkyl groups may have undesirable interactions. Also, compositions of this part which contain disulfide linkages (Rxn 5) on exposure to moisture and air at elevated temperatures can degenerate with formation of corrosive sulfur compounds such as sulfurous and sulfuric acids.

SUMMARY OF THE INVENTION

This invention relates to organosiloxane polymers and compositions containing same that are convertible to crosslinked solids upon exposure to dioxygen, i.e., gaseous oxygen in air or other gases at ambient temperatures, e.g., room temperatures. The novel organosiloxane polymer contain distinctive ethenoic polyunsaturated organic substituents on silicon as the oxygen reactive sites.

The polymers of this invention are cyclic and acyclic organosiloxanes and mixtures thereof; the acyclic organosiloxanes are terminated by triorganosiloxane units. Organic substituents on these polymers are monovalent organic radicals attached to silicon through carbon to silicon bonds. Preferably the major proportion of the organic substituents are methyl. A distinctive feature of the novel polymers is the presence of organic substituents which contain ethenoic polyunsaturated moieties of the 1,3-pentadienylene, —CR@═CR@CR@═CR@CR$_2$@—, preferably, —CH═CH—CH═CH—CH$_2$—, or 1,4-pentadienylene, —CR@═CR@CR@$_2$CR@═CR@—, preferably, —CH═CH—CH$_2$—CH═CH—, types, preferably in minor proportions wherein R@ is hydrogen or alkyl of 1 to 6 carbon atoms, e.g., methyl, and R@ need not be the same throughout each moiety. The polyunsaturated substituents are located on the organosiloxane chains in either terminal or pendant positions or both and are present in proportions such that there is at least one and preferably two or more per molecule on the average. Thus, the novel polyorganosiloxanes contain, per molecule, at least one monovalent ethylenically polyunsaturated organic radical containing at least one 1,3- or 1,4-pentadienylene group bonded to silicon through silicon-to-carbon linkage and in which any remaining valences of silicon are satisfied by silicon-to-oxygen-to-silicon bonds in the siloxane network or by a monovalent organic radical free of more than one ethylenically unsaturated group per monovalent organic radical which is bonded to silicon by a silicon-to-carbon linkage.

There are significant and critical differences between the organosiloxane polymers and compositions of this invention and each of the prior art RTV silicone types.

(1) With regard to the siloxanol-silicate types, the polymers and compositions of this invention do not require silanol groups, organic silicate or polysilicate crosslinkers or the presence of water although such groups and components may be optionally included if desired.

(2) With regard to the moisture reactive types, the polymers and compositions of this invention do not require hydrolyzable groups on silicon or contact with moisture for initiation of the RTV process and obnoxious by-products of condensation are not produced. However, hydrolyzable groups on silicon may be optionally included if desired.

(3) With regard to the vinyl-hydrosiloxane types, the polymers and compositions of this invention do not require the simultaneous presence of SiH, Si-vinyl and platinum containing catalysts for crosslinking although such groups and components may be optionally included if desired.

(4) With regard to the mercaptoalkyl type, the polymers and compositions of this invention need not contain mercaptoalkyl or other thio-organic substituents on silicon although such substituents may be optionally present if desired.

DESCRIPTION OF THE INVENTION

The organosiloxane polymers of this invention can be represented by the average formula:

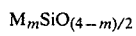

$M_mSiO_{(4-m)/2}$ in which M represents a monovalent organic radical containing 1 to 30, preferably 1–25, carbon atoms each and attached to silicon by carbon-to-silicon bonds, m is a number having an average value of at least 1 but not greater than 3, and wherein each molecule bears at least one M group which contains an ethenoic polyunsaturated moiety selected from 1,3-pentadienylene groups and from 1,4-pentadienylene groups.

One class of novel organosiloxane polymer is depicted by the average formula:

$R_3SiO[R_2SiO]_a[R°_2SiO]_bSiR_3$ wherein R is a monovalent organic group free of more than one olefinically unsaturated group, R° is an organic group having 5 to 30, preferably 5 to 25, carbon atoms and containing a 1,3-pentadienylene group or a 1,4-pentadienylene group, a is a number of 0 to 6000, b is a number of 1 to 100, and the sum of a+b is no greater than 6000.

Included within the scope of this invention is the class of novel organosiloxane polymers in which each average molecule of said polymers contains at least one monovalent organic group of the formula: R'''COONHY— in which R''' is a monovalent hydrocarbon group containing 5 to 25, preferably, 5 to 17, carbon atoms and a 1,3- or 1,4-pentadienylene group, and Y is a divalent hydrocarbon group of 2 to 18, preferably 2 to 12, carbon atoms. Y is bonded to silicon of the polymer through a silicon-to-carbon bond. Any remaining valence of silicon is satisfied by a silicon-to-oxygen-to-silicon bond or by an organic radical free of more than one olefinically unsaturated group per organic radical such as an organic radical free of aliphatic unsaturation. The organic radical is boned to silicon by a silicon-to-carbon bond.

Also included within the scope of this invention are liquid polyorganosiloxanes having the average formula:

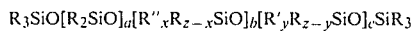

$R_3SiO[R_2SiO]_a[R''_xR_{z-x}SiO]_b[R'_yR_{z-y}SiO]_cSiR_3$ wherein R is a monovalent organic radical free of more than one olefinically unsaturated group; R' is a monovalent organic group of the formula: $H_2NC_nH_{2n}$— wherein n is a number of 2 to 18, preferably 3 to 12; R" is a monovalent organic group of the formula: $R'''COONHC_nH_{2n}$— wherein R''' is a monovalent hydrocarbon group containing a 1,3-pentadienylene or a 1,4-pentadienyl group and n is as defined above; x and y are each numbers of 1 or 2, preferably 1, a is a number of 0 to 500, preferably 450–500; b is a number of 1 to 100, more preferably 2 to 8; c is a number of 0 to 100, preferably 0 to 10, more preferably, 0.5 to 5; and a+b+c is no greater than 600, preferably 1 to 15, more preferably 2.5 to 10.

Preferred polymers within this class are represented by the above formula in which x and y are each 1 such that these polymers are represented by the following average formula:

$$R_3SiO[R_2SiO]_a[R''RSiO]_b[R'RSiO]_cSiR_3$$

wherein R, R', R", a, b and c are defined above.

Typical monovalent organic radicals free of more than one ethylenically unsaturated group mentioned above or depicted by M or R include alkyl groups, such as, methyl, ethyl, n-butyl, 3,3-dimethylbutyl, n-octyl, n-dodecyl and the like, alkenyl groups, such as, vinyl, allyl, cyclohexenyl and the like, heterofunctional alkyl groups, such as, 2-cyanoethyl, 3-cyanopropyl and the like, 3-chloropropyl, 3,3,3-trifluoropropyl and the like, 3-aminopropyl, 4-aminobutyl, 4-amino-3-methylbutyl, and the like, 3-(2-aminoethyl)-aminopropyl, 4-phenylamino)butyl, and the like, 4-(dimethylamino)butyl, 3-hydroxypropyl, 2-mercaptoethyl, 3-mercaptopropyl, and the like, 3-glycidoxypropyl, 2-(3,4-epoxycyclohexyl)ethyl, and the like, 3-methacryloxypropyl, and 3-isocyanatopropyl, and the like, aryl groups, e.g., phenyl, xylyl, tolyl and the like, aralkyl groups, e.g., 2-phenylethyl, 2-(p-tolyl)ethyl, 3-phenylpropyl and the like and 2(nitrophenyl)ethyl, 3-(aminophenyl)propyl and the like.

Typical monovalent organic radicals containing at least one 1,3- or 1,4-pentadenylene group, include
$CH_3(CH_2)_3(CHCH=CH)_2(CH_2)_7CONHC_4H_8$—,
$CH_3(CH_2CH=CH)_3(CH_2)_7CONHCH(CH_3)(CH_2)_3$—,
$CH_3(CH_2)_3(CH=CH)_3(CH_2)_7CONHC(CH_3)_2(CH_2)_3$—,
$CH_3(CH_2)_3(CH=CH)_3(CH_2)_4CO(CH_2)_2COO(CH_2)_3$—,
$CH_3CH_2(CH=CH)_4(CH_2)_7COOCH(CH_3)(CH_2)_2$—,
$CH_3(CH_2)_4(CH=CHCH_2)_4(CH_2)_2COOCH_2CH(OH)CH_2$—,
$CH_2=CHCH=CHCOOCH_2CH_2C_6H_4$—,
$(CH_3)_2C=CHCH=CHC(CH_3)=CHCONHC_6H_4$—,

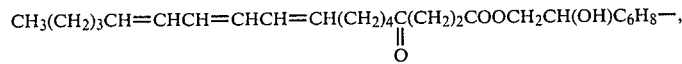

$CH_3(CH=CH)_4COSC_6H_{12}$—, and the like.

The ethenoic polyunsaturated organic substituents are derived from suitable sources. Particularly useful are the readily available octadecadienoic and octadecatrienoic carboxylic acids obtained from vegetable and animal oils. Examples of such acids are: (1) 9,12-octadecadienoic acid (linoleic acid) $CH_3(CH_2)_3(CH_2CH=CH)_2(CH_2)_7CO_2H$, (2) 9,12,15-octadecatrienoic acid (linolenic acid) $CH_3(CH_2CH=CH)_3(CH_2)_7CO_2H$, (3) 9,11,13-octadecatrienoic acid (eleostearic acid) $CH_3(CH_2)_3(CH=CH)_3(CH_2)_7CO_2H$.

Suitable ethenoic polyunsaturated organic substituents are also derived from synthetic organic acids which contain the required 1,3- or 1,4-pentadienyl moieties, as for example 2,4-hexadienoic acid (sorbic acid), the several dihydrobenzoic acids and dihydrophthalic acids and the 3,6-octadienoic acids obtained by reactions of 1,3-dienes with vinylacetic acid as described in G. P. Chiusoli, J. Organomet. Chem., 238, C85 (1982). Furthermore, sources of polyunsaturated substituents are not limited only to carboxylic acids. Generally, any compound containing the requisite 1,3- or 1,4-pentadienylene moiety plus a functional group by means of which it can be coupled either directly to silicon or to an organo-functional substituent on silicon will serve as a source of the 1,3- or 1,4-pentadienylene moiety. For example, if R* represents an organic radical containing the requisite ethanoic polyunsaturated moiety, then direct coupling to silicon can be achieved by Grignard reactions as in the following reaction:

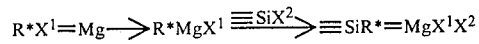

wherein $X^1$ is Cl, Br or I and $X^2$ is Cl, Br, I, alkoxy, or by hydrosilation reactions, as in the following reaction:

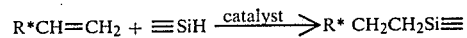

and coupling to organofunctional substituents on silicon can be accomplished by any of a large number of addition and condensation reactions as in the following reaction:

wherein $-Y^1$ and $-Y^2$ represent functional groups such as $-OH$, $-SH$, $-NH_2$, $-NHR$, $-CO_2H$, $-CH=CH_2$,

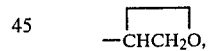

$-SO_3H$, $-NCO$, etc.; $R^2$ is a divalent organic group such as alkylene, phenylene and the like; and $Y^3$ is the linkage formed by reaction of $Y^1$ and $Y^2$ such as an ester linkage $-C(O)O-$ when $Y^1$ is $-OH$ or

and $Y^2$ is $-C(O)OH$; an ether linkage $-OCH_2CH_2-$ when $Y^1$ is $-OH$ and $Y^2$ is $-CH=CH_2$; an amido linkage $-NHC(O)O-$ when $Y^1$ is $-NH_2$ and $Y^2$ is $-C(O)OH$; a urethane linkage $-NHCOO-$ when $Y^1$ is NCO and $Y^2$ is OH; a sulfonamido linkage $-SO_2NH-$ when $Y^1$ is $-NH_2$ and $Y^2$ is $-SO_3H$ and so forth.

The novel organosiloxane polymers of this invention are prepared by any of several reaction schemes well known in the art, several of which are described hereinbelow.

SCHEME 1

In this reaction scheme, organic source compounds containing the requisite polymer saturation are treated to form diorgano- or triorganosilane monomers, e.g. $R^*MeSiX_2$ or $R^*Me_2SiX$ where $R^*$ represents a polyunsaturated substituent and X represents a hydrolyzable group such as halo, alkoxy, acyloxy, and said monomers alone or in mixture with other organosilane monomers are treated by hydrolysis, condensation, and equilibration techniques well known in the art to form organosiloxane polymers within the scope of this invention. As a more particular illustration, linolenic acid (I) is reacted with allyl alcohol (II) and the resulting allyl ester product (III) is hydrosilylated with methyldichlorosilane (IV) to form the diorganosilane monomer 3-linolenoyloxypropylmethyldichlorosilane (V) shown by the following reaction equations:

$CH_3(CH_2CH=CH)_3 (CH_2)_7CO_2H + CH_2=CHCH_2OH \longrightarrow$ (I)                               (II)

$CH_3(CH_2CH=CH)_3(CH_2)_7C(O)O(CH_2)_7CO_2CH_2CH=CH_2 +$ (III)

$H_2O$ (III) + $CH_3SiHCl_2 \xrightarrow{Pt}$ (IV)

$CH_3(CH_2CH=CH)_3(CH_2)_7C(O)O(CH_2)_3(CH_3)SiCl_2$ (V)

Monomer (V) is mixed with selected proportions of $Me_3SiCl$ and $Me_2SiCl_2$ and then is hydrolyzed and condensed to form the organosiloxane polymers within the scope of this invention.

SCHEME 2

In this reaction sequence, organic compounds containing the requisite 1,3- or 1,4-pentadienyl structures are reacted with organocyclosiloxanes which have one or more functional substituents per molecule to form adducted cyclosiloxanes which are mixed with selected proportions of linear organopolysiloxanes and diorganocyclosiloxanes are subjected to catalyzed siloxane redistribution (i.e. equilibrations) to form organosiloxane polymers within the scope of this invention. As a more particular illustration, allyl linoleate ester (VI) is hydrosilylated with heptamethylcyclotetrasiloxane (VII) to form 3-linoleoyloxypropylheptamethylcyclotetrasiloxane (VIII) as shown in the following reaction equation:

$CH_3(CH_2)_3(CH_2CH=CH)_2(CH_2)_7C(O)OCH_2CH=CH_2 +$ (VI)

$[MeHSiO(Me_2SiO)_3] \longrightarrow$ (VII)

$[CH_3(CH_2)_3CH_2CH=CH)_2(CH_2)_7C(O)O(CH_2)_3(Me)SiO(Me_2SiO)_3]$ (VIII)

The adduct cyclosiloxane (VIII) is mixed with decamethyltetrasiloxane and octamethylcyclotetrasiloxane in proportions selected to provide the desired ratios of triorganosiloxane to diorganosiloxane units and of polyunsaturated substituents to silicon is subjected to catalyzed siloxane rearrangements (i.e., equilibrations) to form organosiloxane polymers within the scope of this invention.

SCHEME 3

In this reaction sequence, preformed triorganosiloxy terminated diorganosiloxane polymers containing selected proportions of organofunctional substituents are reacted with polyunsaturated compounds which bear functional groups so as to chemically couple the polyunsaturated compound to the organofunctional substituent of the organosiloxane polymer to form organosiloxane polymers within the scope of this invention. As a more particular illustration, a trimethylsiloxy terminated copolymer of dimethylsiloxane and 4-aminobutylmethylsiloxane (IX) are reacted with polyunsaturated carboxylic acids (X) to form adduct copolymers in which the acid is attached to the siloxane copolymer through ammonium carboxylate salt linkages (XI) which are subsequently converted to amide linkages (XII) by heating while removing water, as depicted in the following reaction equation:

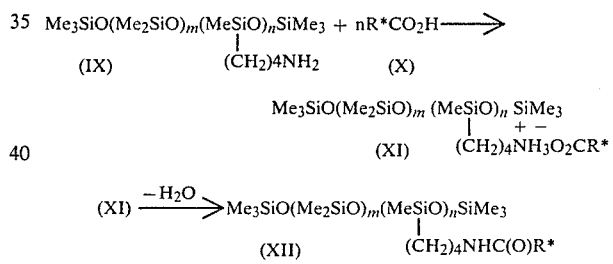

The resulting organosiloxane polymers are within the scope of this invention. As a second particular embodiment of this scheme, preformed organosiloxane copolymers containing glycidoxypropyl substituents (XIII) are reacted with polyunsaturated acids (X) to form adduct copolymers (XIV) within the scope of this invention as shown by the following equation:

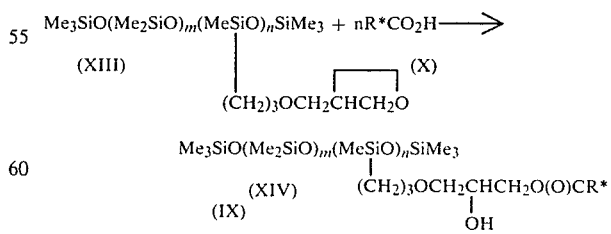

Thus, the organosiloxane polymers of this invention can be made by the reaction schemes described above or any suitable variations thereof, as well as other schemes known in art. For operational simplicity and convenience in control of polymer composition and molecular size, it is preferred to use certain versions of Scheme 3 as described in the examples, but this is not to be considered as limiting.

The polymers may vary in molecular size over a wide range, i.e., they may contain on average from 2 to as many as 5,000 silicon atoms or more. Polymers containing less than about 500 silicon atoms are useful in the compositions of the invention as components for adjustment of flow properties and crosslink densities. Polymers containing from about 500 to about 2,000 silicon atoms are useful as the major polymer components of compositions of liquid or soft paste consistencies used in casting and sealant compounds. Those containing more than about 2,000 silicon atoms are useful in high consistency compositions suitable for high pressure extrusion and calendering compounds.

The useful proportions of oxygen reactive ethenoic polyunsaturated substituents, $R^*$, $R^o$ or $R'''$, in the polymers will vary with the molecular size and intended uses of the novel polymers. An illustrative index of this proportionment in the ratio $R^*/Si$ which is the number of ethenoic polyunsaturated substituents containing 1,3- or 1,4-pentadienylene moieties, in a novel polymer molecule divided by the number of silicon atoms in that molecule. Broadly, $R^*/Si$ varies from 1.0 to 0.0001 in the novel polymers. For smaller polymers which contain from 2 to about 500 silicon atoms, $R^*/Si$ preferably has a value of from 1.0 to about 0.002. For moderately sized polymers which contain from about 500 to about 2,000 silicon atoms, $R^*/Si$ preferably has a value of from about 0.1 to about 0.0005. For higher polymers which contain from about 2,000 to about 5,000 or more silicon atoms, $R^*/Si$ preferably has a value of from about 0.02 to about 0.0002.

The curable compositions of this invention are intimate mixtures of a polymer component, which consists of one or more of the above described novel polymers of this invention, with selected additional components such as fillers, curing catalysts (driers), catalyst activators and/or plasticizers.

A variety of particulate and fibrous fillers are used as components in the novel compositions, as for example, those described in the Pigment Handbook, T. C. Patton ed., Vol. I, John Wiley and Sons, New York, 1973. Of particular value are the following fillers: titanium dioxide, zinc oxide, antimony oxide, calcium carbonates (natural or synthetic), natural silica (amorphous, crystalline, diatomaceous, microcystalline), synthetic silica (precipitated, pyrogenic, aerogel and hydrogel), aluminum silicate, e.g., kaolin, natural calcium silicate (wollastonite), synthetic calcium silicate, magnesium silicate, e.g., talc, aluminum potassium silicate, e.g., mica, hydrated aluminum oxide, carbon blacks, graphite, aluminum flake, and the like.

The curing process by which a polymeric crosslinked network develops upon exposure of the novel compositions to gaseous oxygen is accelerated by metal compounds known in the paint and varnish art as driers. Driers suitable for use in this invention are listed in Kirk-Othmer Encyclopedia of Chemical Technology, 3rd edition, Vol. 8, pp. 34–49. Commonly used driers are salts of monocarboxylic acids and metals such as, barium, bismuth, calcium, cerium, chromium, copper, iron, lead, magnesium, manganese, molybdenum, nickel, rare earths metals, tin, zinc, zirconium, and the like. However, other organic ligands on the metals can also be used, for example, alkoxide, acetylacetonate, cyclopentadienylide, carbonyl, etc., and the type of ligand is usually not critical as long as the metal-ligand compound is soluble in the polymer component. For the compositions of this invention, preferred metal driers are the carboxylic acid salts of bismuth, cobalt, copper, tin, iron, lead, manganese and molybdenum. The metal driers may be used either singly or in combination. Combinations of two or more metal driers may be used to obtain a desirable balance of composition properties. Preferred combinations are 2-ethylhexanoic acid salts of cobalt/lead, cobalt/bismuth and cobalt/lead/bismuth. The metal driers are used in concentrations up to about 0.4 parts (as metal) per hundred parts of novel polymer component and preferably from about 0.001 to 0.200 parts (as metal) per hundred parts of novel polymer.

The catalytic activity of the metal drier cure catalysts can be further intensified by incorporation of activator components in the compositions. Activator components may be incorporated either as separate activating compounds or as an organofunctional substituents in the polymer component. Typical separate activating compounds are organic nitrogen compounds, including N, N'disalicylidene-1,2-diaminopropane, 2,4,6-tris (dimethylaminomethyl)phenol, 2,2'-dipyridine, 1,10-phenanthroline and the like, organic hydroperoxides, including t-butyl hydroperoxide, cumyl hydroperoxide and the like, bromine compounds, including, zinc bromide, 1,4-dibromobutane, 2,4,6-tribromophenol and the like, boron compounds, including, boron oxide, triethylborate, trimethoxyboroxine and the like. Typical activating organofunctional groups which can be introduced as part of the novel polymer component are primary, secondary and tertiary amine groups. Activator components are used in concentrations up to about 1 part per hundred parts of novel polymer component and preferably from about 0.001 to 0.500 parts per hundred parts of novel polymer component.

Plasticizer components are either reactive or non-reactive types and are well known to those skilled in the art. Reactive plasticizers are capable of reacting during the curing process to become largely unextractable from the cured compositions. Non-reactive plasticizers include polyorganosiloxane oils and gums which bear only alkyl and aryl hydrocarbon substitutents and hydrocarbon mineral oils of low unsaturation. Reactive plasticizers include (a) polyorganosiloxane oils and gums which bear vinyl, allyl, methacryloxypropyl or other monounsaturated substituents, (b) oligomers of butadiene, isoprene and other dienes, (c) acrylate and methacrylate esters of polyhydric alcohols, (d) allyl esters of polybasic carboxylic acids. Plasticizer components are used in concentrations up to about 100 parts per hundred parts of the novel polymer component and preferably from 0.5 to 50 parts per hundred parts of the novel polymer component.

In addition, the novel curable compositions may contain additional optional components which function as coloring pigments, flow control agents, antioxidants, thermal stabilizers, ultra-violet absorbants, odorants, etc. or any other special effects additive.

The novel curable compositions undergo crosslinking upon exposure to oxygen at ambient temperatures, for example, 50° F. or lower to 80° F. or higher. Elevated temperatures can be used to accelerate the curing reaction during which the curable composition goes through the consecutive stages of first thickening (Th), then becoming an elastic gel (E.G.) and then becoming cured throughout (C.T.). Some of the novel curable compositions can be fully cured within a matter of hours whereas as others, similar to conventional oil-based housepaints can take weeks or months to fully cure.

The following examples are presented in which, unless otherwise designated, all parts and percentages are on a weight basis and all temperatures are on the Centigrade scale, and the following designations are defined below:

| | |
|---|---|
| Et: | ethyl |
| Me: | methyl |
| M: | $Me_3SiO_{\frac{1}{2}}$ |
| D: | $Me_2SiO—$ |
| D*: | $MeHSiO=$ |
| $D_4$: | $[Me_2SiO]_4$ |
| $D°$: | $H_2NCH_2CH(Me)CH_2CH_2Si(Me)O$ |
| D': | $H_2NC_4H_8Si(Me)O$ |
| D'': | $CH_3(CH_2CH=CH)_3(CH_2)_7COONHC_4H_8Si—(Me)O$ |
| D''': | $CH_3CH=CHCH=CHC(O)ONHC_4H_8Si(Me)O$ |
| $D^4$: | $CH_3(CH_2CH=CH)_3(CH_2)_6CH(COOEt)—O(CH_2)_3Si(Me)O$ |
| $D^5$: | $CH_3(CH_2)_3(CH_2CH=CH)_2(CH_2)_7COO—(CH_2)_3Si(Me)O$ |
| $n_D^{25}$: | index of refraction |
| cstk or cs: | centistokes, viscosity |
| cps: | centipoise, viscosity determined by Brookfield Viscometer |
| °C.: | temperature in degrees Centigrade |
| °F.: | temperature in degrees Fahrenheit |
| g: | weight in grams |
| gms: | weight in grams |
| Hrs: | time in hours |
| Min: | time in minutes |
| wt: | weight |
| pts: | parts |
| ml: | milliliter |
| %: | percent |
| mm: | millimeters |
| no: | number |
| ": | inch |
| psi: | pounds per square inch |
| tensile strength (psi): elongation at break: set at break: | all by ASTM D412-75 procedures |

In the Examples the % compression deflection determinations were made by a procedure in which the specimen disc is placed between platens of a thickness gage (Model 202, B. C. Ames Co., Waltham, Mass., upper platen diameter 0.25") and the disc thickness ($T_o$) measured at no load. Weight sufficient to produce a pressure of about 11.5 psi on gage upper platen face is applied to compress the specimen. Thickness of the compressed specimen ($T_1$) is measured when the change in gage reading becomes less than 0.001"/minute and % compression deflection is calculated as $100 (T_o-T_1)/T_o$. Representations of formulas for silicones in the Examples and elsewhere in this specificaton are average or nominal formulas.

EXAMPLE 1

Illustrates preparation of a trimethylsiloxy terminated copolymer of 4-amino-3-methylbutylmethylsiloxy units and dimethylsiloxy units.

Octamethyl cyclotetrasiloxane, 144.0 parts; 10 centistoke trimethylsiloxy terminated polydimethylsiloxane, having an average molecular weight of about 1250 and a nominal formula of: $MD_{14.7}M$, 3.0 parts; and 4-amino-3-methylbutyl(methyl)siloxane cyclic tetramer having the nominal formula of: $[D°]_4$, 3.0 parts, were stirred and heated to 90° C. under $N_2$ in a 250 ml flask. Tetramethylammonium dimethylsilanolate catalyst, 0.28 parts (containing 0.006 parts $Me_4N+$), was added and two further additions of the catalyst, 0.14 parts each, were made at 105 and 173 minutes. At 210 minutes, the mixture was heated to 150°–160° C. to decompose the catalyst and at 240 minutes the system was flushed with $N_2$ for 30 minutes to remove volatile matter. After cooling to room temperature under $N_2$, the product, 139.3 parts, was a clear liquid having a Brookfield viscosity of 10,000 centipoises. The product had the following nominal formula: $MD_{825.5}D°_{8.6}M$ and contained about 2 wt. % 4-amino-3-methylbutyl(methyl)siloxy, $D°$, units.

EXAMPLE 2

Illustrates preparation of four trimethylsiloxy terminated copolymers of 4-aminobutyl(methyl)siloxy units and dimethylsiloxy units.

Using the method of Example 1, 2,000 ml flasks were charged with the types and amounts of siloxanes and catalysts for each copolymer as listed in Table 1 and reactions carried out pursuant to Example 1. After reaction and after cooling to room temperature each product was a clear liquid having the viscosity listed in Table 1 and was recovered in the amounts listed in Table 1.

TABLE 1

| | Weight Parts | | | |
|---|---|---|---|---|
| Copolymer No | 1 | 2 | 3 | 4 |
| Octamethylcyclotetrasiloxane | 1122. | 1134. | 1146. | 1152. |
| 10 cstk trimethylsiloxy Terminated polydimethyl siloxane[(1)] | 42. | 42. | 42. | 42. |
| 4-aminobutyl(methyl)siloxane cyclic tetramer[(2)] | 36. | 24. | 12. | 6. |
| Tetramethylammonium dimethylsilanolate | 5. | 5. | 5. | 5. |
| Recovered amount (wt. pts.) | 1150. | 1159. | 1143. | 1153. |
| Brookfield viscosity (cps) | 2730. | 2910. | 3110. | 2980. |
| Wt. % 4-aminobutyl(methyl) siloxy units | 3 | 2 | 1 | 0.5 |

[(1)]Average molecular weight of 1250 and a nominal formula of: $MD_{14.7}M$
[(2)]Nominal formula of: $[D']_4$
The nominal formulas for each of the products are given below:
Copolymer No. 1 $MD_{466}D'_{8.18}M$
Copolymer No. 2 $MD_{470.8}D'_{5.45}M$
Copolymer No. 3 $MD_{475.6}D'_{2.73}M$
Copolymer No. 4 $MD_{478}D'_{1.36}M$

EXAMPLE 3

Illustrates preparation of adduct copolymers of linolenic acid and 4-aminobutylmethylsiloxane-dimethylsiloxane copolymers.

To a 500 ml flask equipped with Stark and Dean condensate trap surmounted by a reflux condenser were charged a copolymer of Example 2 as designated in Table 2 and a solution of linolenic acid in the amounts shown in Table 2 in 130 parts toluene. The mixture was stirred and the system flushed with $N_2$ for several minutes then maintained under a slight positive flow of $N_2$. The mixture was heated and held at reflux for 3 hours during which time water appearing in the condensate trap was drained off. Toluene solvent was then distilled off with a slow flushing of $N_2$ to assist final stripping with the pot temperature limited to 150° C. The product was cooled to room temperature under $N_2$.

TABLE 2

| Adduct Copolymer No. | Weight Parts | | | | | | | |
|---|---|---|---|---|---|---|---|---|
| | 1 | 2 | 3 | 4 | 5 | 6 | 7 | 8 |
| Copolymer from Example 2 | | | | | | | | |
| 1 | 200 | | | | 200 | | | |
| 2 | | 200 | | | | 200 | | |
| 3 | | | 200 | | | | 200 | |
| 4 | | | | 200 | | | | 200 |
| Linolenic Acid | 11.5 | 7.6 | 3.8 | 1.9 | 9.6 | 6.4 | 3.2 | 1.6 |
| Toluene | 130. | 130. | 130. | 130. | 130. | 130. | 130. | 130. |
| Mole Ratio | | | | | | | | |
| Linolenic Acid 4-aminobutyl-methylsiloxane Product | 0.9 | 0.9 | 0.9 | 0.9 | 0.75 | 0.75 | 0.75 | 0.75 |
| Brookfield Viscosity (cps) | 10800 | 7150 | 6500 | 4640 | 7480 | 6850 | 7150 | 7200 |

The nominal formulas for each of Adduct Copolymers Nos. 1 through 8 are given below:

| Adduct Copolymer No. | Nominal Formula |
|---|---|
| 1 | $MD_{466}D'_{0.82}D''_{7.36}M$ |
| 2 | $MD_{470.8}D'_{0.55}D''_{4.9}M$ |
| 3 | $MD_{475.6}D'_{0.27}D''_{2.46}M$ |
| 4 | $MD_{478}D'_{0.14}D''_{1.22}M$ |
| 5 | $MD_{466}D'_{2.05}D''_{6.13}M$ |
| 6 | $MD_{470.8}D'_{1.36}D''_{4.09}M$ |
| 7 | $MD_{475.6}D'_{0.68}D''_{2.05}M$ |
| 8 | $MD_{478}D'_{0.34}D''_{1.02}M$ | wherein M, D and D' are as defined in Example 2 and $D'' = [CH_3(CH_2CH=CH)_3(CH_2)_7C(O)ONHC_4H_8Si(Me)O]$

EXAMPLE 4

Illustrates curing of compositions of adduct copolymers of Example 3 on exposure to air.

15 parts of each of the adduct copolymers of Example 3 were mixed with 0.75 parts of cobalt octoate drier (6% cobalt Catalox, Ferro Corporation) to form a mixture containing about 0.3 parts cobalt (as metal) per 100 parts copolymer. Mixing and transfer of materials was carried out in a nitrogen atmosphere. About 8 parts of each mixture was poured into aluminum cups, evenly distributed to form liquid layers about 3 mm in depth and exposed to the atmosphere at ambient room temperatures. The exposed films were examined visually and tactually at intervals up to 48 hours exposure to air at room temperature for signs of curing. The amounts of adduct copolymer and drier in each composition and the condition of 3 mm films thereof after various intervals of time of exposure to air are given in Table 3.

The results given in Table 3 illustrate the wide range of curing rates provided by the compositions of this invention extending from fast curing compositions, e.g., Composition No. 5 which cured throughout in less than two hours, to slow curing compositions, e.g., Composition No. 8 which began to cure between one and two days. These experiments also demonstrate that the time to cure upon exposure to air at room temperatures of the copolymers of this invention are adjustable over a useful wide range by varying the concentrations of the polyunsaturated moeity or the residual aminoalkyl group or both while holding constant the concentration of metal catalyst.

TABLE 3

| Composition No. | Weight Parts | | | | | | | |
|---|---|---|---|---|---|---|---|---|
| | 1 | 2 | 3 | 4 | 5 | 6 | 7 | 8 |
| Adduct Copolymer of Example 3 No. | | | | | | | | |
| 1 | 15 | | | | | | | |
| 2 | | 15 | | | | | | |
| 3 | | | 15 | | | | | |
| 4 | | | | 15 | | | | |
| 5 | | | | | 15 | | | |
| 6 | | | | | | 15 | | |
| 7 | | | | | | | 15 | |
| 8 | | | | | | | | 15 |
| 6% Cobalt Octoate Drier (Catalox - Ferro Corp.) | 0.75 | 0.75 | 0.75 | 0.75 | 0.75 | 0.75 | 0.75 | 0.75 |
| Condition of 3 mm films exposed to air at room temperature (hours) | | | | | | | | |
| 1 | N.C. | N.C. | N.C. | N.C. | E.G. | TH. | N.C. | N.C. |
| 2 | TH. | N.C. | N.C. | N.C. | C.T. | E.G. | TH. | N.C. |
| 3 | E.G. | TH. | N.C. | N.C. | C.T. | C.T. | TH. | N.C. |
| 24 | C.T. | E.G. | E.G. | N.C. | C.T. | C.T. | E.G. | N.C. |
| 48 | C.T. | C.T. | E.G. | N.C. | C.T. | C.T. | E.G. | TH. |

N.C. — No Change
TH. — Thickened, still liquid
E.G. — Elastic Gel
C.T. — Cured Throughout (3 mm depth)

EXAMPLE 5

Illustrates curing of compositions of the adduct copolymers Nos. 2 and 6 of Example 3 with various metal drier catalysts on exposure to air.

Using the method of Example 4, compositions of adduct copolymers Nos. 2 and 6 of Example 3 with various metal octoate driers were prepared and exposed to the atmosphere at room temperatures. The exposed films were examined at intervals up to 72 hours of exposure to air for signs of curing. The amounts of adduct copolymer and amounts and types of driers in each composition and the condition of 3 mm films made therefrom after various intervals of exposure to air at room temperature are given in Table 4.

These experiments demonstrate that the copolymers of this invention cure upon exposure to air at room temperature in the presence of each of a variety of metal catalysts.

TABLE 4

| Composition No. | Weight Parts | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Adduct Copolymer of Example 3 No. | | | | | | | | | | | | | | |
| 2 | 15 | 15 | 15 | 15 | 15 | 15 | 15 | | | | | | | |
| 6 | | | | | | | | 15 | 15 | 15 | 15 | 15 | 15 | 15 |
| Metal Octoate Dryer | | | | | | | | | | | | | | |
| 6% Cobalt[1] | 0.75 | | | | | | | 0.75 | | | | | | |
| 6% Manganese[1] | | 0.75 | | | | | | | 0.75 | | | | | |
| 25% Lead[1] | | | 0.75 | | | | | | | 0.75 | | | | |
| 5% Calcium[1] | | | | 0.75 | | | | | | | 0.75 | | | |
| 8% Zinc[1] | | | | | 0.75 | | | | | | | 0.75 | | |
| 6% Zirconium[1] | | | | | | 0.75 | | | | | | | 0.75 | |
| 18% Tin(II)[2] | | | | | | | 0.75 | | | | | | | 0.75 |
| Condition of 3 mm films exposed to air at room temperature (hours) | | | | | | | | | | | | | | |
| 1 | N.C. | N.C. | N.C. | N.C. | N.C. | N.C. | TH. | TH. | N.C. | N.C. | N.C. | N.C. | N.C. | TH. |
| 2 | N.C. | N.C. | TH. | N.C. | N.C. | N.C. | TH. | E.G. | N.C. | TH. | N.C. | N.C. | N.C. | TH. |
| 3 | N.C. | N.C. | TH. | N.C. | N.C. | N.C. | TH. | E.G. | N.C. | TH. | N.C. | N.C. | N.C. | TH. |
| 24 | E.G. | TH. | E.G. | N.C. | N.C. | TH. | TH. | E.G. | TH. | E.G. | N.C. | N.C. | N.C. | E.G. |
| 48 | E.G. | TH. | E.G. | TH. | TH. | TH. | E.G. | E.G. | TH. | E.G. | TH. | TH. | TH. | E.G. |
| 72 | E.G. | TH. | E.G. | TH. | TH. | TH. | E.G. | E.G. | TH. | E.G. | TH. | TH. | TH. | E.G. |

N.C. — No Change
TH. — Thickened, still liquid
E.G. — Elastic Gel
[1]Catalox - Ferro Corp.
[2]T-9 Stannous octoate - M&T Chem. Corp.

EXAMPLE 6

Illustrates curing of compositions in which adduct copolymers Nos. 1, 2, 3 and 4 of Example 3 are blended to provide equal average concentrations of reactive substituents.

Using the method of Example 4, compositions of adduct copolymers Nos. 1, 2, 3 and 4 of Example 3, were blended to provide equal average concentrations of reactive substituents, with cobalt octoate drier were prepared and exposed to the atmosphere at room temperature. The exposed films were examined at intervals up to 72 hours exposure to air at room temperature for signs of curing. The amounts of adduct copolymers and amounts of drier in each composition and the condition of 3 mm films thereof after various intervals of exposure to air at room temperature are given in Table 5.

These experiments demonstrate (1) that mixtures of the copolymers of this invention cure upon exposure to air at room temperatures and (2) that copolymers and mixtures of copolymers which contain equal average concentrations of reactive substituents cure upon exposure to air at room temperatures in similar manners.

TABLE 5

| Composition No. | Weight Parts | | |
|---|---|---|---|
| | 1 | 2 | 3 |
| Adduct Copolymer of Example 3 | | | |
| No. 1 | | 7.5 | 9.0 |
| No. 2 | 15. | | |
| No. 3 | | 7.5 | |
| No. 4 | | | 6.0 |

TABLE 5-continued

| Composition No. | Weight Parts | | |
|---|---|---|---|
| | 1 | 2 | 3 |
| 6% Cobalt Octoate Drier (Catalox - Ferro Corp.) | 0.75 | 0.75 | 0.75 |
| Condition of 3 mm film, exposed to air at room temperature (hours) | | | |
| 1 | N.C. | TH. | N.C. |
| 2 | N.C. | TH. | TH. |
| 4 | TH. | TH. | TH. |
| 24 | E.G. | E.G. | E.G. |
| 48 | E.G. | E.G. | E.G. |
| 72 | E.G. | E.G. | E.G. |

EXAMPLE 7

Illustrates curing of compositions of adduct copolymer No. 5 of Example 3 with metal octoate driers and combinations thereof.

Using the method of Example 4, compositions of adduct copolymer No. 5 of Example 3 with various cobalt, lead and tin (II) octoate driers and combinations thereof were prepared and exposed to the atmosphere at room temperature. The amounts of adduct copolymer and the types and amounts of driers and the condition of 3 mm films thereof at various intervals after exposure to air at room temperature are given in Table 6.

These experiments demonstrate that the copolymers of this invention which are admixed with either a single metal catalyst or a mixture of two different metal catalysts cure upon exposure to air at room temperatures.

TABLE 6

| | Weight Parts | | | | | | |
|---|---|---|---|---|---|---|---|
| | 1 | 2 | 3 | 4 | 5 | 6 | 7 |
| Adduct Copolymer Of Example 3 No. 5 | 15. | 15. | 15. | 15. | 15. | 15. | 15. |

TABLE 6-continued

|  | Weight Parts |  |  |  |  |  |  |
|---|---|---|---|---|---|---|---|
|  | 1 | 2 | 3 | 4 | 5 | 6 | 7 |
| 6% Cobalt Octoate[1] | 0.75 | 0.50 | 0.25 |  | 0.50 | 0.25 |  |
| 24% Lead[1] |  | 0.25 | 0.50 | 0.75 |  |  |  |
| 28% Tin(II) Octoate[2] |  |  |  |  | 0.25 | 0.50 | 0.75 |
| Condition of 3 mm films exposed to air at room temperature (hours) |  |  |  |  |  |  |  |
| 1 | E.G. | E.G. | E.G. | N.C. | N.C. | N.C. | TH. |
| 2 | E.G. | E.G. | E.G. | N.C. | TH. | TH. | TH. |
| 3 | E.G. | E.G. | E.G. | N.C. | TH. | TH. | TH. |
| 24 | E.G. | E.G. | E.G. | TH. | E.G. | E.G. | E.G. |
| 48 | E.G. | E.G. | E.G. | TH. | E.G. | E.G. | E.G. |
| 72 | E.G. | E.G. | E.G. | TH. | E.G. | E.G. | E.G. |

[1]Catalox - Ferro Corp.
[2]T-9 Stannous octoate - M&T Chem. Corp.

EXAMPLE 8

Illustrates curing of compositions of adduct copolymer No. 5 of Example 3 with cobalt and bismuth octoate driers and combinations thereof.

Using the method of Example 4, compositions of adduct copolymer No. 5 of Example 3 with cobalt octoate and bismuth octoate and combinations thereof were prepared and exposed to the atmosphere at room temperature. The amounts of adduct copolymers and amounts and types of drier in each composition and the condition of 3 mm films thereof after various intervals of exposure to air at room temperature are given in Table 7.

These experiments demonstrate that the copolymers of this invention which are admixed with either a single metal catalyst or a mixture of two different metal catalysts cure upon exposure to air at room temperatures.

TABLE 7

|  | Weight Parts |  |  |  |  |  |  |  |  |
|---|---|---|---|---|---|---|---|---|---|
|  | 1 | 2 | 3 | 4 | 5 | 6 | 7 | 8 | 9 |
| Adduct Copolymer of Example 3 No. 5 | 10. | 10. | 10. | 10. | 10. | 10. | 10. | 10. | 10. |
| 8.2% Bismuth Octoate[1] |  | 0.256 | 0.512 |  | 0.256 | 0.512 |  | 0.256 | 0.512 |
| 4.1% Bismuth Octoate[2] | 0.256 |  |  | 0.256 |  |  | 0.256 |  |  |
| 0.3% Cobalt Octoate[3] |  |  |  | 0.166 | 0.166 | 0.166 |  |  |  |
| 0.6% Cobalt Octoate[4] |  |  |  |  |  |  | 0.166 | 0.166 | 0.166 |
| Parts Metal/100 Parts Copolymer |  |  |  |  |  |  |  |  |  |
| Bismuth | 0.105 | 0.210 | 0.420 | 0.105 | 0.210 | 0.420 | 0.105 | 0.210 | 0.420 |
| Cobalt | — | — | — | 0.005 | 0.005 | 0.005 | 0.010 | 0.010 | 0.010 |
| Condition of 3 mm films exposed to air at room temperature (hours) |  |  |  |  |  |  |  |  |  |
| 3 | TH. | TH. | TH. | TH. | TH. | TH. | TH. | TH. | TH. |
| 24 | TH. | E.G. | TH. | E.G. | E.G. | TH. | E.G. | E.G. | TH. |
| 48 | E.G. | E.G. | TH. | E.G. | E.G. | TH. | E.G. | E.G. | TH. |
| 144 | E.G. | E.G. | TH. | E.G. | E.G. | E.G. | E.G. | E.G. | E.G. |

[1]Shepherd Chemical Co.
[2]1 part 8.2% Bismuth Octoate diluted with 1 part toluene
[3]1 part 0.6% Cobalt Octoate diluted with 1 part toluene
[4]1 part 6% Cobalt Octoate (Catalox - Ferro Corp.) diluted with 9 parts toluene

EXAMPLE 9

Illustrates the preparation of an adduct copolymer of sorbic acid and an aminobutylmethylsiloxane-dimethylsiloxane copolymer having the general formula: $MD_{544}D'_{9.56}M$ where M, D and D' are as defined in Example 2.

Using the method of Example 3, a trimethylsiloxy terminated copolymer of dimethylsiloxane containing 3 wt. % 4-aminobutylmethylsiloxy unit content and having a Brookfield viscosity of 4475 cps. and the general formula given above was prepared from 1128 wt. parts of octamethylcyclotetrasiloxane, 36 wt. parts of the 10 cstk trimethylsiloxy end-blocked polydimethylsiloxane described in Examples 1 and 2 and 36 wt. parts of the cyclic tetramer of 4-aminobuty(methyl)siloxane. The copolymer was reacted with sorbic acid (2,4-hexadienoic acid) in a mole ratio of sorbic acid/4-amino butyl methyl siloxane of 0.75 to form a clear, liquid adduct copolymer having the general formula: $MD_{544}D'_{2.39}D''_{7.17}M$ wherein M, D, D', D''' and M are as defined hereinabove.

EXAMPLE 10

Illustrates curing of compositions of the linolenic acid adduct copolymer No. 5 of Example 3, the sorbic acid adduct copolymer of Example 8 and a blend of the two with combinations of cobalt and lead octoate driers.

Using the method of Example 4, compositions of a linolenic acid adduct copolymer (No. 5, Example 3), a sorbic acid adduct copolymer (Example 8) and a blend thereof with various combinations of cobalt and lead octoate driers were prepared and exposed to the atmosphere at room temperature. The types and amounts of the adduct copolymer(s) and driers in each composition and the condition of 3 mm films thereof after 3 and 24 hours exposure to air at room temperature are given in Table 8.

These experiments when taken together with the experiments of Examples 4, 5, 6, 7 and 8, demonstrate that copolymers containing different polyunsaturated substituents cure upon exposure to air at room temperatures.

TABLE 8

|  | Weight Parts | | | | | | | |
|---|---|---|---|---|---|---|---|---|
|  | 1 | 2 | 3 | 4 | 5 | 6 | 7 | 8 |
| Adduct Copolymer |  |  |  |  |  |  |  |  |
| Linolenic Acid adduct copolymer No. 5, Example 3 | 10 | 10 | 10 | 5 | 5 |  |  |  |
| Sorbic acid adduct copolymer of Example 8 |  |  |  | 5 | 5 | 10 | 10 | 10 |
| 6% Cobalt Octoate[1] | .025 | .025 | .025 | .025 | .025 | .025 | .025 | .025 |
| 24% Lead[2] | .084 | .042 | .021 | .084 | .021 | .084 | .042 | .021 |
| Condition of 3 mm films exposed to air at room temperature (hours) |  |  |  |  |  |  |  |  |
| 3 | N.C. | N.C. | N.C. | N.C. | N.C. | N.C. | N.C. | N.C. |
| 24 | E.G. | E.G. | E.G. | E.G. | E.G. | E.G. | E.G. | E.G. |

N.C. — No Change
E.G. — Elastic Gel
[1]Catalox - Ferro Corp.
[2]Added as 1 wt. part lead in 9 wt. parts toluene

EXAMPLE 11

Illustrates preparation of compositions of a linolenic acid adduct copolymer, calcium carbonate filler and cobalt/lead octoate drier and the cast molding and room temperature curing in air thereof.

In a Hobart bowl mixer fitted with a close fitting anchor blade was placed a linolenic acid adduct copolymer of a trimethylsiloxy terminated copolymer of dimethylsiloxane and 3 wt. % of 4-aminobutylmethylsiloxy unit content produced as composition No. 5 in Example 3. The liquid adduct copolymer was stirred while calcium carbonate filler was added slowly. Stirring was continued with occasional wipe-down until a visually homogeneous mixture was formed. Cobalt and lead octoate catalysts were then incorporated. The mixture was then transferred to an open cavity sheet mold (4"×6"×⅛") and degassed at reduced pressure. The filled mold was then exposed to the atmosphere at room temperature. After 5 days exposure, the compositions in the form of sheets had cured throughout sufficiently to be removed from the mold and hung in air with all surfaces exposed. Small discs about 0.4" diameter were cut from sheet with a cork borer at intervals and % compression deflection under 11.5 psi load was measured. A time plot indicated that substantially complete cure of the ⅛-inch sheet was attained in 15–20 days exposure time. Table 9 sets forth the amounts of adduct copolymer, filler and driers used in each composition and also the % compression deflection measurements for each cured composition sheet.

These experiments demonstrate that compositions comprising a copolymer of this invention admixed with particulate filler and metal catalysts cure upon exposure to air at room temperature.

TABLE 9

|  | Weight Parts | | |
|---|---|---|---|
|  | 1 | 2 | 3 |
| Adduct Copolymer of Example 3 No. 5 | 150 | 150 | 150 |
| Calcium Carbonate[1] | 75 | 112.5 | 150 |
| 6% Cobalt Octoate[2] | 0.38 | 0.38 | 0.38 |
| 24% Lead Octoate[2] | 1.25 | 1.25 | 1.25 |
| % Compression Deflection After Exposure To Air At Room Temperature For |  |  |  |
| 5 days | 17.1 | 13.4 | 12.0 |
| 6 days | 12.7 | 8.3 | 9.1 |
| 7 days | 10.1 | 7.3 | 6.8 |
| 8 days | 7.5 | 6.1 | 5.5 |
| 12 days | 6.3 | 5.0 | 3.7 |
| 13 days | 6.4 | 4.9 | 4.4 |
| 14 days | 5.3 | 4.7 | 4.1 |
| 20 days | 5.8 | 3.7 | 4.5 |

[1] and [2] See Table 8

EXAMPLE 12

Illustrates preparation of two compositions of two linolenic acid adduct copolymers A and B, produced in a manner similar to that described for Adduct Copolymers Nos. 5 and 6, respectively of Example 3, hydrophobic pyrogenic silica filler and cobalt/lead octoate driers and the molding and room temperature curing in air thereof.

Two compositions were prepared in a Ross Planetary Mixer under nitrogen atmosphere and degassed under reduced nitrogen pressure. The degassed compositions were spread into 6"×6"×⅛" rectangular open cavity sheet molds having a polytetrafluoroethylene film bottom liner and a polytetrafluoroethylene spray coated Holland cloth top liner. After 20 days exposure to air at room temperatures the cured elastomers were tested for tensile strength and elongation at break. Table 10 identifies the adduct copolymer and gives the amounts and types of filler and driers used in each composition. Table 10 also provides the tensile strength and elongation at break measured for each cured composition sheet.

These experiments demonstrate that compositions comprising a copolymer of this invention admixed with particulate filler and metal catalysts cure upon exposure to air at room temperature.

TABLE 10

|  | 1 | 2 |
|---|---|---|
| Linolenic Acid Adduct Copolymer | A | B |
| Wt. % 4-aminobutylmethylsiloxy unit content | 3 | 2 |
| Mole ratio $\frac{\text{linolenic acid}}{\text{4-aminobutylmethylsiloxane}}$ | 0.75 | 0.75 |
| Wt. Parts | 100 | 100 |
| Hydrophobic Silica[1], wt. parts | 11. | 11. |
| 6% Cobalt Octoate, wt. parts | 0.25 | 0.25 |
| 24% Lead Octoate, wt. parts | 0.83 | 0.83 |

TABLE 10-continued

|  | 1 | 2 |
|---|---|---|
| Physical properties of ⅛" films exposed to air 20 days at room temperature |  |  |
| Tensile strength (psi) | 160 | 220 |
| Elongation at Break (%) | 90 | 140 |
| Set at Break (%) | 0 | 0 |

(1) Degussa - R972 Silica

EXAMPLE 13

Illustrates preparation of ethyl 2-[3-(methyldichlorosilyl)propyloxy]linolenate.

Under dry nitrogen, 302.5 parts (1 mole) ethyl (2-allyloxy)linolenate and 120.8 parts (1.05 mole) methyldichlorosilane are stirred and heated to slow reflux. Then 5.6 parts of a 1.0 wt. % solution of hexachloroplatinic acid hexahydrate in 1,2-dimethoxyethane are added to provide about 50 ppm platinum as metal on the total mass. Thereafter, the mixture is heated to about 70° C. for about 3 hours. The mixture then is heated and sparged with dry nitrogen gas to remove volatile components. The reaction product intermediate, ethyl 2-[3-(methyldichlorosilyl)propyloxy]linolenate, $CH_3(CH_2CH=CH)_3(CH_2)_6CH(COOC_2H_5)$—$OC_3H_6Si(Me)Cl_2$, is cooled to room temperature and filtered under dry nitrogen atmosphere to remove any suspended solids.

EXAMPLE 14

Illustrates preparation of a trimethylsiloxy terminated copolymer of dimethylsiloxy units and 3-[1-ethoxycarbonyl-8,11,14-heptadecatrienoxy]propyl(methyl)siloxy units.

Under dry nitrogen atmosphere, 5 parts of the reaction product intermediate of Example 13, 200 parts dimethyldichlorosilane, 2 parts of trimethylmonochlorosilane and 200 parts toluene are stirred and heated to about 40° C. while 56% parts water is added dropwise and by-product hydrogen chloride is removed by passing a stream of dry nitrogen gas across the stirred liquid surface. Thereafter, 10 parts powdered sodium bicarbonate is added and the mixture heated and stirred for about 3 hours. Thereafter, the reaction mixture is filtered to remove suspended solids. Thereafter, the filtered reaction mixture is heated to about 100° C. under reduced pressure (about 20 torr) to remove toluene and other volatile components. The reaction product is a clear liquid with a bulk viscosity of about 800 centipoises and a nominal composition of $MD_{335.4}D^4{}_{2.3}M$ wherein M, D and $D^4$ are as defined above and $D^4$ is a group of the formula: $CH_3(CH_2CH=CH)_3(CH_2)_6CH$—$(COOC_2H_5)OC_3H_6Si(Me)O$, which when mixed with cobalt octoate to provide 0.25 parts cobalt (as metal) per 100 parts of the reaction product and exposed to the normal ambient temperature as a layer about 3 mm in depth, is expected to harden to an elastic gel in about 2 days.

EXAMPLE 15

Illustrates preparation of 3-linoleoyloxypropylheptamethylcyclotetrasiloxane.

Under dry nitrogen atmosphere, 320.5 parts (1.0 mole) allyl linoleate and 296.7 parts (1.05 mole) heptamethylcyclotetrasiloxane $[Me_2SiO]_3HMeSiO$ are stirred and heated to 70° C. and 8.19 parts of a 1 wt. % solution of hexachloroplatinic acid hexahydrate is added to provide 50 ppm platinum as metal. After about 3 hours the mixture is heated to about 100° C. under reduced pressure (about 20 torr) to remove volatile components, then cooled to room temperature and filtered. The filtered reaction product is a clear liquid containing 3-linoleoyloxypropylheptamethylcyclotetrasiloxane, $D_3D^5$, represented by the formula: $[Me_2SiO]_3$ 3-$[CH_3(CH_2)_3(CH_2CH=CH)_2(CH_2)_7COO]C_3H_6(Me)SiO$, as the major component.

EXAMPLE 16

Illustrates preparation of a trimethylsiloxy terminated copolymer of dimethylsiloxy and 3-linoleoyloxypropylmethylsiloxy units.

Under dry nitrogen atmosphere, 14.5 parts (0.24 mole) of the reaction product of Example 14, 59.2 parts (0.8 mole) octamethylcyclotetrasiloxane and 2.5 parts (0.008 mole) decamethyltetrasiloxane are stirred and heated to 90° C. Tetramethylammonium dimethylsilanolate is added to provide 100 ppm tetramethylammonium ion. The mixture is heated at 90° C. for three hours then at 150° C. for one hour. Thereafter, the mixture is heated at 150° C. under reduced pressure (20 torr) to remove volatile components then cooled to room temperature. The reaction product is a viscous liquid with bulk viscosity of about 1200 centipoises and a nominal composition $MD_{411}D^5{}_{3.0}M$ (where M, D and $D^5$ are defined above) which when mixed with cobalt octoate to provide 0.25 parts cobalt (as metal) per 100 parts reaction product and exposed to the normal ambient atmosphere as a layer about 3 mm in depth, is expected to harden to an elastic gel in about 2 days.

EXAMPLE 17

Illustrates preparation of a trimethylsiloxy terminated adduct copolymer of dimethylsiloxy and linolenoylethoxypropylmethylsiloxy units.

Under a dry nitrogen atmosphere, 100 parts of a copolymer having the nominal composition $MD_{1200}D^*{}_6M$ (wherein M, D and $D^*$ are as defined hereinabove) and 2.7 parts of ethyl (2-allyloxy)linolenate are heated to 70° C. Then 0.82 parts of a 1 wt. % solution of hexachloroplatinic acid hexahydrate in 1,2-dimethoxyethane are added to provide about 30 ppm platinum (as metal) per 100 parts of reaction mixture. Thereafter, the mixture is heated at 70° C. for about 3 hours, then cooled to room temperature. The product has the nominal formula of $MD_{1200}D^{4''}{}_6M$ (wherein M, D and $D^4$ are as defined hereinabove). The product is a viscous liquid having a bulk viscosity of about 30,000 centipoises which when mixed with cobalt octoate to provide 0.25 parts cobalt (as metal) per 100 parts product and exposed to the normal ambient atmosphere as a layer about 3 mm in depth, is expected to harden to an elastic gel in about 2 days.

What is claimed is:

1. A polyorganosiloxane that is curable to a crosslinked material at ambient temperature upon exposure to gaseous oxygen, said polyorganosiloxane containing, per molecule, at least one monovalent olefinically polyunsaturated organic radical containing at least one 1,3-pentadienylene group or 1,4-pentadienylene group bonded to silicon through silicon-to-carbon bond and wherein any remaining valence of silicon is satisfied by a silicon-to-oxygen-to-silicon bond or by a monovalent organic radical free of more than one olefinically unsaturated group per said monovalent organic radical, said monovalent organic radical being bonded to silicon by a silicon-to-carbon bond.

2. A polyorganosiloxane as claimed in claim 1 having the average formula:

R₃SiO[R₂SiO]ₐ[R°ₓR₂₋ₓSiO]ᵦSiR₃ wherein R is a monovalent organic group free of more than one olefinically unsaturated group, R° is an organic group containing a 1,3-pentadienylene group or a 1,4-pentadienylene group, a is a number of 0 to 6000, b is a number of 1 to 100, the sum of a+b is no greater than 6000, and x is a number of 1 to 2.

3. A liquid polyorganosiloxane as claimed in claim 1, said polyorganosiloxane containing, per molecule, at least one monovalent organic group of the formula: R′″COONHY— wherein R′″ is a monovalent hydrocarbon group containing 5 to 25 carbon atoms and containing a 1,3-pentadienylene or a 1,4-pentadienylene group and Y is a divalent hydrocarbon group of 2 to 18 carbon atoms bonded to silicon, through silicon-to-carbon bond and wherein any remaining valence of silicon is satisfied by a silicon-to-oxygen-to-silicon bond or by an organic radical free of more than one olefinically unsaturated group per organic radical, said organic radical being bonded to silicon by a silicon-to-carbon bond.

4. A polyorganosiloxane as claimed in claim 3 wherein Y is an alkylene group of 2 to 12 carbon atoms and R′″ contains 5 to 17 carbon atoms.

5. A polyorganosiloxane as claimed in claim 1 curable to a crosslinked material at ambient temperature upon exposure to gaseous oxygen and having the average formula:

R₃SiO[R₂SiO]ₐ[R″ₓR₂₋ₓSiO]ᵦ[R′ᵧR₂₋ᵧSiO]𝒸SiR₃ wherein R is a monovalent organic radical free of more than one olefinically unsaturated group; R′ is a monovalent organic group of the formula: H₂NCₙH₂ₙ— wherein n is a number of 2 to 18; R″ is a monovalent organic group of the formula: R′″COONHCₙH₂ₙ— wherein R′″ is a monovalent hydrocarbon group containing a 1,3-pentadienylene or a 1,4-pentadienyl group and n is as defined above; x and y are each numbers of 1 to 2; a is a number of 0 to 600; b is a number of 1 to 100; c is a number of 0 to 100; and a+b+c is no greater than 600.

6. A liquid polyorganosiloxane curable to an elastomeric material at ambient temperature upon exposure to oxygen and having the formula:

R₃SiO[R₂SiO]ₐ[R″RSiO]ᵦ[R′RSiO]𝒸SiR₃ wherein R, R′, R″, a, b and c are defined in claim 5.

7. A liquid polyorganosiloxane as claimed in claim 6 wherein R is methyl.

8. A liquid polyorganosiloxane as claimed in claim 6, wherein R is methyl, n is 4, and R′″ is

CH₃(CH₂CH=CH)₃(CH₂)₇—.

9. A liquid polyorganosiloxane as claimed in claim 6, wherein R is methyl, n is 4 and R′″ is CH₃(CH=CH)₂—.

10. A liquid polyorganosiloxane as claimed in claim 6, wherein R is methyl, n is 4 and R′″ is CH₃(CH₂)₃(CH₂CH=CH)₂(CH₂)₇—.

11. A liquid polyorganosiloxane as claimed in claim 6, wherein R is methyl, n is 5 and R′″ is CH₃(CH₂CH=CH)₃(CH₂)₇—.

12. A liquid polyorganosiloxane as claimed in claim 6, wherein R is methyl, n is 5 and R′″ is CH₃(CH=CH)₂—.

13. A liquid polyorganosiloxane as claimed in claim 6, wherein R is methyl, n is 5 and r′″ is CH₃(CH₂)₃(CH₂CH=CH)₂(CH₂)₇—.

14. A liquid polyorganosiloxane as claimed in claim 6, wherein a is a number of 400 to 600, b is a number of 1 to 10, c is a number of 0 to 10, and b+c is a number of 1 to 15.

15. A liquid polyorganosiloxane as claimed in claim 6, wherein a is a number of 450 to 550, b is a number of 2 to 8, c is a number of 0.5 to 5, and b+c is a number of 2.5 to 10.

16. A liquid polyorganosiloxane as claimed in claim 14 wherein R″ is CH₃(CH₂CH=CH)₃(CH₂)₇COONHC₄H₈—.

17. A liquid polyorganosiloxane as claimed in claim 15 wherein R″ is CH₃(CH₂CH=CH)₃(CH₂)₇COONHC₄H₈—.

18. A liquid polyorganosiloxane as claimed in claim 14 wherein R″ is CH₃CH=CHCH=CHCOONHC₄H₈—.

19. A composition curable upon exposure to gaseous oxygen comprising a polyorganosiloxane as claimed in claim 1 and 0.001 to 0.2 wt. part, based on one hundred wt. parts of said polyorganosiloxane, of a metal drier.

20. A composition curable upon exposure to gaseous oxygen comprising a polyorganosiloxane as claimed in claim 3, and 0.001 to 0.4 wt. part, based on one hundred wt. parts of said polyorganosiloxane, of a metal drier.

21. A composition curable upon exposure to gaseous oxygen comprising a polyorganosiloxane as claimed in claim 3, 0 to 200 wt. parts, based on one hundred wt. parts of said polyorganosilane, of a filler and 0 to 0.4 wt. part, being based on one hundred wt. parts of said polyorganosiloxane, of a metal drier.

22. A composition curable upon exposure to gaseous oxygen comprising a polyorganosiloxane as claimed in claim 6, 0 to 100 wt. parts, based on one hundred wt. parts of said polyorganosilane, of a filler, 0.001 to 0.2 wt. part, based on one hundred wt. parts of said polyorganosilane, of a metal drier, 0 to 1 wt. part, based on one hundred wt. parts of said polyorganosilane, of a activator and 0. to 100 wt. parts, based on one hundred weight parts of said polyorganosiloxane, of plasticizer.

23. A composition curable upon exposure to gaseous oxygen comprising a polyorganosiloxane as claimed in claim 6, 0 to 100 wt. parts, based on one hundred parts of said polyorganosiloxane, of a filler, 0.001 to 0.2 wt. parts, based on one hundred parts of said polyorganosiloxane, of a metal drier, 0.001 to 0.5 wt. parts, based on one hundred parts of said polyorganosiloxane, of a activator and 0.5 to 50 wt. parts, based upon 100 wt. parts of said polyorganosiloxane, of a plasticizer.

24. Composition as claimed in claim 23 wherein more than one metal drier is incorporated in said composition.

25. Composition as claimed in claim 23 wherein said metal drier is a carboxylate salt of cobalt.

26. Composition as claimed in claim 24 wherein said metal drier comprises a carboxylate salt of cobalt and a carboxylate salt of tin.

27. Composition as claimed in claim 24 wherein said metal drier comprises a carboxylate salt of cobalt and a carboxylate salt of lead.

28. Composition as claimed in claim 24 wherein said metal drier comprises a carboxylate salt of cobalt and a carboxylate salt of bismuth.

29. Composition as claimed in claim 23 wherein said polyorganosiloxane is $$R_3SiO(R_2SiO)_a(R''RSiO)_b(R'RSiO)_cSiR_3$$

wherein R is a monovalent organic radical free of more than one olefinically unsaturated group; R' is a monovalent organic group of the formula:

$$H_2NC_nH_{2n}-$$

wherein n is a number of 2 to 18;
R'' is $CH_3(CH_2CH=CH)_3(CH_2)_7COONHC_4H_8-$;
a is a number of 400 to 600; b is a number of 1 to 10; c is a number of 0 to 10; a+b+c is no greater than 600; and b+C is a number of 1 to 15.

30. Composition as claimed in claim 29 wherein said polyorganosiloxane is characterized in that a is a number of 450 to 550, b is a number of 2 to 8, c is a number of 0.5 to 5, and b+c is a number of 2.5 to 10.

* * * * *

UNITED STATES PATENT AND TRADEMARK OFFICE
CERTIFICATE OF CORRECTION

PATENT NO. : 4,526,954
DATED : July 2, 1985
INVENTOR(S) : Thomas Charles Williams It is certified that error appears in the above-identified patent and that said Letters Patent is hereby corrected as shown below:

IN THE CLAIMS

Claim 13, line 2, please delate "r'''" and insert therefor -- R''' -- .

Claim 21, line 4, please delete "polyorganosilane" and insert therefor -- polyorganosiloxane --.

Claim 22, lines 4,5,6 and 7, please delete "polyorganosilane" in each occurence and insert therefor -- polyorganosiloxane --.

Signed and Sealed this

Third Day of December 1985

[SEAL]

Attest:

DONALD J. QUIGG

Attesting Officer

Commissioner of Patents and Trademarks